United States Patent [19]
Suh

[11] Patent Number: 5,850,265
[45] Date of Patent: Dec. 15, 1998

[54] INTELLIGENT TELEVISION RECEIVER AND METHOD OF PROCESSING DATA THEREIN

[75] Inventor: Moon-hwan Suh, Seoul, Rep. of Korea

[73] Assignee: Samsung Electronics Co., Ltd., Kyungki-do, Rep. of Korea

[21] Appl. No.: 705,642

[22] Filed: Aug. 30, 1996

[30] Foreign Application Priority Data

Aug. 31, 1995 [KR] Rep. of Korea .................. 1995-28749
Sep. 1, 1995 [KR] Rep. of Korea .................. 1995-28900

[51] Int. Cl.$^6$ ....................................................... H04N 5/44
[52] U.S. Cl. ........................... 348/553; 348/564; 348/569; 348/554; 348/12
[58] Field of Search ...................................... 348/553, 554, 348/563, 564, 569, 6, 7, 10, 12; 455/5.1; 434/307 A; H04N 5/44, 5/445

[56] References Cited

U.S. PATENT DOCUMENTS 5,721,593 2/1998 Suh ......................................... 348/564

*Primary Examiner*—Sherrie Hsia
*Attorney, Agent, or Firm*—Sughrue, Mion, Zinn, Macpeak & Seas, PLLC

[57] ABSTRACT

An intelligent television receiver for receiving a signal of a desired channel and displaying it on a CRT is provided. The intelligent television receiver is operable with computer communication services provided by a value added network and includes a modem for transmitting and receiving information data according to connection command data while being connected with a value added network (VAN) via a communication cable. The intelligent television receiver also includes an information processing unit for outputting the connection command data if a communication mode is set in the receiver, for decoding the information data transmitted from the modem to display the information on a CRT and for transmitting command data necessary for the transmission and reception of the information data to the modem.

34 Claims, 8 Drawing Sheets

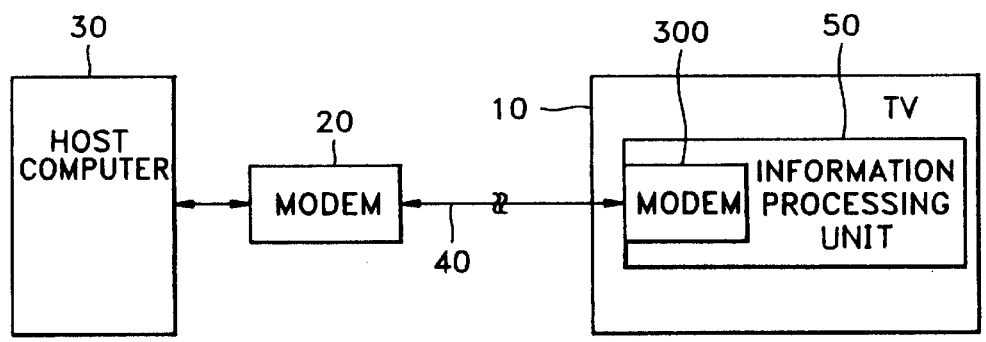
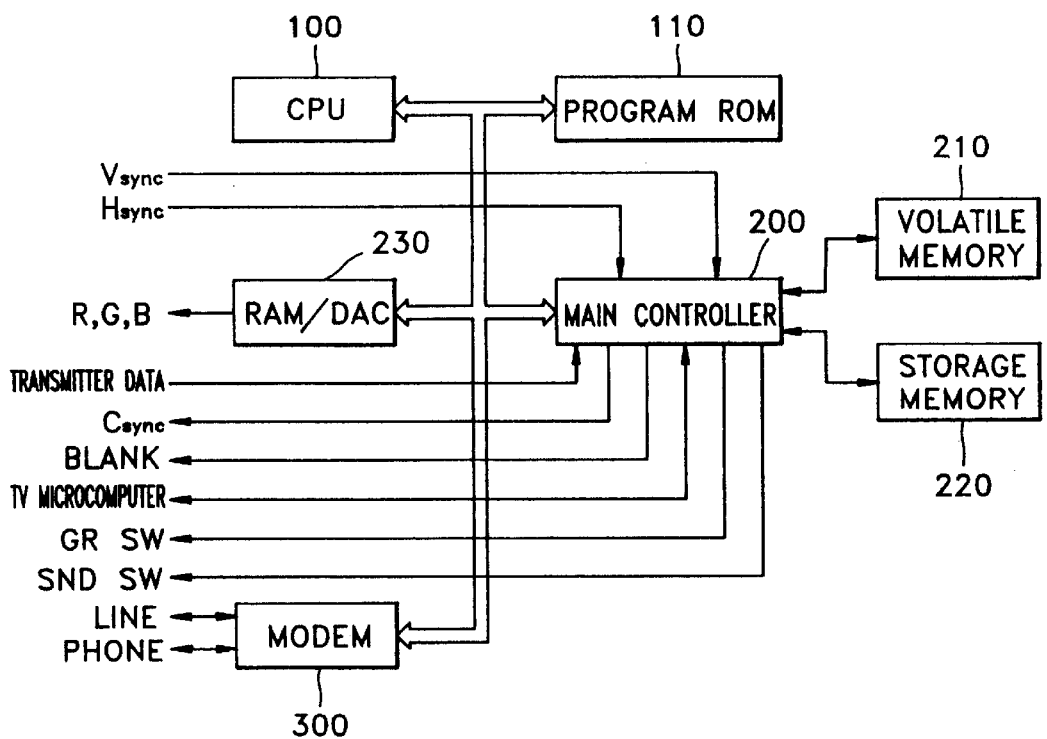

INTELLIGENT TELEVISION RECEIVER AND METHOD OF PROCESSING DATA THEREIN

BACKGROUND OF THE INVENTION

The present invention relates to an intelligent television receiver operable with a communication information service transmitted through a value added network (VAN) and method of processing information data in the intelligent television receiver.

In general, a television receiver receives a radio frequency (RF) signal transmitted from a broadcasting station or via a cable. General purpose personal computers can be also connected to receive such signals.

A computer may further provide communication functions to receive various kinds of communication services transmitted via the VAN. Such communication services include transmission of information communication data (hereinafter referred to as "information data") on stock market quotes, news, weather or television information. In the present invention, the computer communication function is incorporated into the television receiver so that even persons inexperienced with computers can easily use the various communication services.

SUMMARY OF THE INVENTION

Therefore, it is a first object of the present invention to provide an intelligent television receiver which can receive a communication service by connection through a telephone line to a value added network (VAN).

It is a second object of the present invention to provide an intelligent television receiver having a communication karaoke function.

It is a third object of the present invention to provide an intelligent television receiver for outputting background music during a television mode-to-communication mode conversion.

It is a fourth object of the present invention to provide an intelligent television receiver for outputting an audio message indicating no answer when a called party does not respond to an incoming signal.

It is a fifth object of the present invention to provide an intelligent television receiver which can be used in an expanded capability mode when a communication mode is selected.

It is a sixth object of the present invention to provide a method for processing information data received in an intelligent television receiver.

It is a seventh object of the present invention to provide a method for processing information data for a communication karaoke mode received in an intelligent television receiver.

It is an eighth object of the present invention to provide a method for preventing the calculation of transmission costs for song data which includes a reception error generated in a communication karaoke mode of an intelligent television receiver.

To accomplish the above objects, there is provided an intelligent television receiver comprising: a modem for transmitting and receiving information data according to connection command data while connected with a value added network (VAN) via a communication cable; and an information processing unit for outputting the connection command data if a communication mode is set, decoding the information data transmitted from the modem to display the information data on a CRT and transmitting command data necessary for the transmission and reception of the information data to the modem.

According to another aspect of the present invention, there is provided an information data processing method for an intelligent television receiver for receiving a signal of a desired channel to be displayed on a CRT and receiving information data of a graphic or text state, provided through a value added network (VAN), and decoding the received data, the method comprising the steps of: (a) setting a communication mode; (b) selecting a communication item if the communication mode is set; (c) connecting the intelligent television to the VAN if the communication item is selected; (d) receiving information data depending on the selected communication item if the intelligent television is connected with the VAN; (e) determining whether an error is generated in the received data; (f) requesting retransmission of the information data if an error is generated in the received data in the step (e); (g) decoding the received data if an error is not generated in the received data in the step (e); (h) displaying the decoded data on the CRT; (i) checking a command depending on key inputs concurrent with the step (h); (j) transmitting the command checked in said step (i) to the VAN if the command is concerned with a communication mode; and (k) disconnecting a line and converting the operating mode of the intelligent television into a television mode if the command is a connection completion command.

Also, according to still another aspect of the present invention, there is provided an information data processing method for a communication karaoke mode of an intelligent television receiver for transmitting and receiving information data from a value added network, the method comprising the steps of: (a) setting the communication karaoke mode; (b) selecting a desired song; (c) receiving the selected song data; (d) determining whether an error is generated in the selected song data; (e) processing the song data if an error is not generated in the received song data in the step (d); and (f) requesting retransmission of song data if an error is generated in the received song data in the step (d).

Also, according to still yet another aspect of the present invention, there is provided an information data processing method for a communication karaoke mode of an intelligent television receiver for receiving a signal of a desired channel, displaying the signal on a CRT, and transmitting and receiving information data from a value added network, the method comprising the steps of: (a) setting the communication karaoke mode; (b) selecting a desired song; (c) receiving the selected song data; (d) determining whether the selected song data is received without an error; (e) processing the song data if the song data is received without an error in said step (d); (f) transmitting a code signal to invalidate a counted service fee if an error is generated in the received song data; (g) canceling a transmission fee of the song corresponding to the invalidated service fee; and (h) requesting retransmission of the sound data.

BRIEF DESCRIPTION OF THE DRAWINGS

The above objects and advantages of the present invention will become more apparent by describing in detail preferred embodiments thereof with reference to the attached drawings in which:

FIG. 1 is a diagram showing an intelligent television receiver connected to a value added network according to the present invention;

FIG. 3 is a detailed block diagram of an information processing unit shown in FIG. 2 according to an embodiment of the present invention;

DETAILED DESCRIPTION OF THE INVENTION

Figure 2:
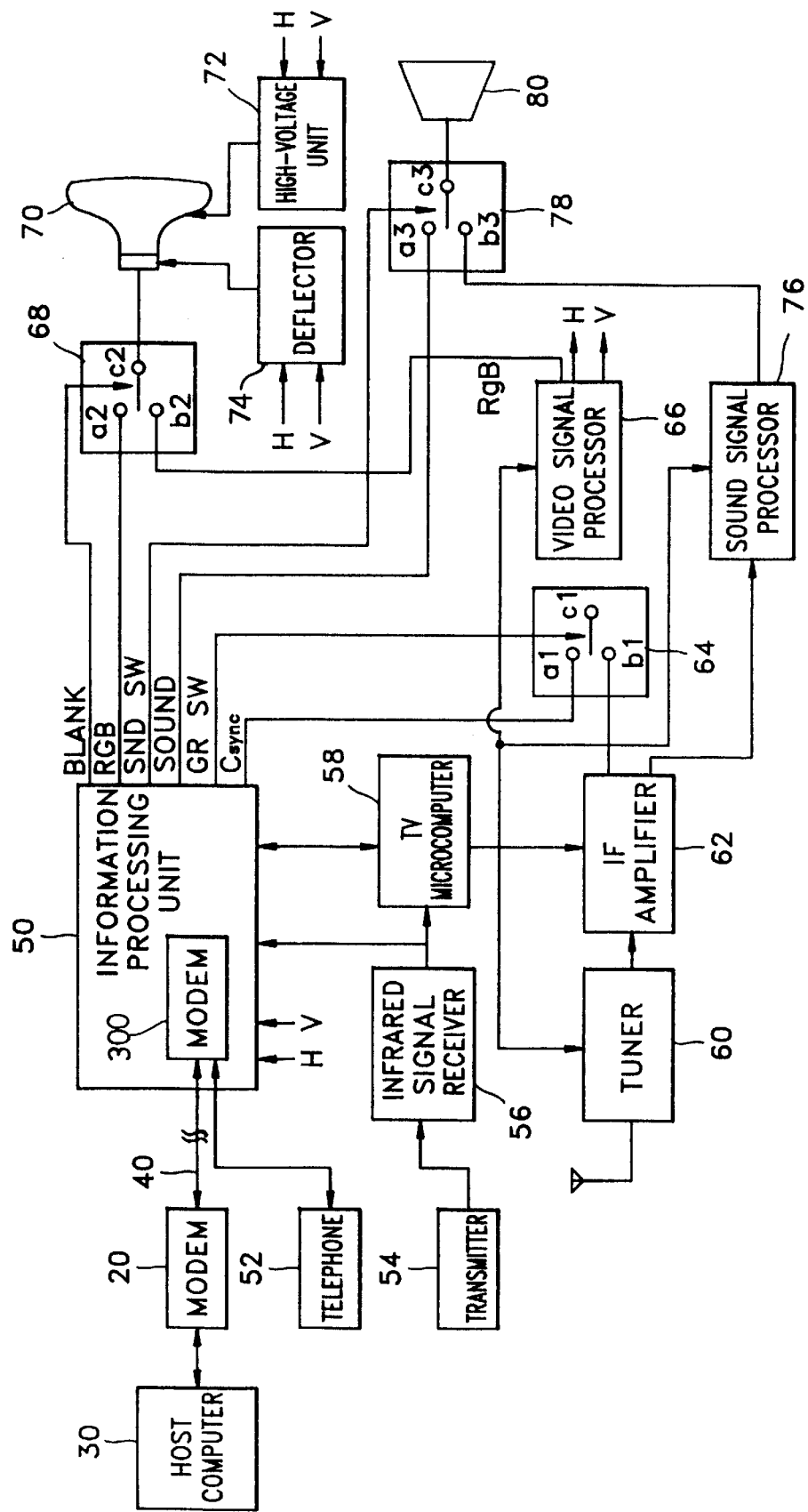
FIG. 2 is a block diagram of an intelligent television receiver according to the present invention.

Referring to FIG. 1, an intelligent television receiver 10 has an information processing unit 50 for transmitting and receiving information data via a modem 300, and decoding the information data received via the modem 300, thereby providing a communication service.

Here, the modem 300 may be a distinct and separate component outside the information processing unit 50. However, for convenience of explanation, the modem 300 is regarded as being internally constructed in the information processing unit 50.

Also, the intelligent television receiver 10 is connected to a host computer 30 operated by a VAN operator for the communication service through a modem 20.

FIG. 2 is a block diagram of an intelligent television receiver according to the present invention. Specifically, the intelligent television receiver includes an information processing unit 50, a transmitter 54, an infrared signal receiver 56, a TV microcomputer 58, a tuner 60, an IF amplifier 62, a first selector 64, a video signal processor 66, a second selector 68, a CRT driver 72, a deflector 74, a sound signal processor 76, and a third selector 78.

The information processing unit 50 receives and decodes information data of a graphic or a text state when the intelligent TV is connected to a value added network (VAN).

The transmitter 54 has a communication mode key as well as various function keys and number keys for use in the television mode, and transmits an infrared signal when a key is pressed.

The infrared signal receiver 56 receives an infrared signal according to key inputs provided by the transmitter 54 and outputs the received signal to the information processing unit 50 and the TV microcomputer 58.

The TV microcomputer 58 generates control signals for television signal processing in accordance with the infrared signal. Also, the TV microcomputer 58 transmits and receives data to and from the information processing unit 50.

The tuner 60 selects a radio frequency (RF) broadcast signal received via an antenna under the control of the TV microcomputer 58 and converts the selected RF signal into an intermediate frequency (IF) signal.

The IF amplifier 62 amplifies the IF signal under the control of the TV microcomputer 58 and outputs the amplified signal as an IF video signal and an IF sound signal.

The first selector 64 has a first selection port a1 connected to a composite synchronization (sync) signal $C_{sync}$ port of the information processing unit 50, a second selection port b1 connected to an IF video signal port of the IF amplifier 62, a selection control port connected to a control signal (GR SW) port of the information processing unit 50, and an output port c1 which supplies the selected output to the input port of the video signal processor 66.

The video signal processor 66 processes the signal selected by the first selector 64 under the control of the TV microcomputer 58 and outputs an RGB signal and horizontal and vertical sync signals H and V.

The second selector 68 has a first selection port a2 connected to an RGB signal port of the information processing unit 50, a second selection port b2 connected to the RGB signal port of the video signal processor 66, a selection control port connected to a blank control signal port of the information processing unit 50, and an output port c2 which outputs the selected signal to a CRT 70.

The CRT driver 72 drives the CRT 70 in accordance with the horizontal and vertical sync signals H/V from the video signal processor 66.

The deflector 74 receives the horizontal and vertical sync signals H/V from the video signal processor 66 and supplies a deflecting current signal to the CRT 70.

The sound signal processor 76 inputs the IF sound signal output from the IF amplifier 62 and outputs processed signals as left and right sound signals.

The third selector 78 has a first selection port a3 for receiving the left and right sound signals from the information processing unit 50, a second selection port b3 for receiving the left and right sound signals from the sound signal processor 76, a selection control port connected to a control signal SND SW from the information processing unit 50, and an output port c3 which outputs the selected signals to a speaker 80.

In FIG. 2, a modem 20 and host computer 30, which belong to the VAN operator's equipment, are included along with a telephone 52 which is not a component of the intelligent TV.

The operation of the intelligent television receiver shown in FIG. 2 will now be described.

If a user sets a communication mode using the transmitter 54, the information processing unit 50 transmits a telephone number of the VAN operator to the modem 300. The modem 300 dials the telephone number to connect the television to the host computer 30 through the modem 20 and the telephone line 40.

When the television is connected to the host computer, if a communication command is input to the transmitter 54, data communication between the host computer 30 and the information processing unit 50 of the television 10 is established.

At this time, a menu screen for selecting a desired communication item, for example, 1) news, 2) stock market quotes, 3) communication karaoke, etc. is displayed as an initial information screen, and the user selects the desired communication item from the menu screen.

The conversion into the communication mode is performed by pressing a communication key installed in the transmitter 54. Also, the selection of the communication item is performed by using number keys or function keys of the transmitter 54.

The information processing unit 50 decodes data received from the host computer 30 via the modem 20, stores the same in an internal memory and then displays the stored data on a screen. The telephone 52 is connected to the modem 300 of the information processing unit 50, and the modem 20 detects on/off hooks, a key tone and key numbers of the telephone 52.

The infrared signal receiver 56 receives an infrared signal corresponding to a key for setting a communication mode, a key for selecting a communication item or keys for a television mode and outputs the received signal to the information processing unit 50 and the television microcomputer 58.

The television microcomputer 58 recognizes the function of the infrared signal output from the infrared signal receiver 56 to control the tuner 60, IF amplifier 62, video signal processor 66 and sound signal processor 76, and transmits and receives serial data to/from the information processing unit 50.

The tuner 60 receives a radio frequency (RF) signal via an antenna and selects the IF signal of a desired channel under the control of the television microcomputer 58 having recognized the infrared signal corresponding to the key input of the transmitter 54. The IF amplifier 62 amplifies the IF signal of the selected channel and outputs the IF video signal and IF sound signal.

The first selector 64 selects the composite sync signal $C_{sync}$ output from the information processing unit 50 or the IF video signal output from the IF amplifier 62 according to the control signal (GR SW) output from the information processing unit 50. Specifically, when the information data is to be displayed entirely on the current screen, the composite sync signal $C_{sync}$ is selected. When the television signal or the television plus information signals is to be displayed on the screen, the IF video signal of the IF amplifier 62 is selected.

If the IF video signal is selected in the first selector 64, the video signal processor 66 processes the IF video signal to output an RGB signal and horizontal and vertical sync signals (H/V). If the composite sync signal $C_{sync}$ is selected in the first selector 64, the composite sync signal $C_{sync}$ is separated and the horizontal and vertical sync signals (H/V) are output.

In other words, in the case of displaying the television or a television plus an information signal on the screen, the video signal processor 66 separates the RGB signal and the horizontal and vertical sync signals (H/V) of the television signal so that the RGB signal is output to the second selection port b2 of the second selector 68 and the horizontal and vertical sync signals (H/V) are output to the main controller 200, CRT driver 72 and deflector 74. In the case of displaying the information signal on the screen, the video signal processor 66 receives the composite sync signal $C_{sync}$ from the main controller 200 (See FIG. 3) and generates the horizontal and vertical sync signals (H/V) in synchronization with synchronized horizontal and vertical sync signals of the television signal by means of an internally installed automatic frequency adjusting circuit and phase-locked loop (PLL) circuit to output the signal to the main controller 200, CRT driver 72 and deflector 74.

In addition to the above-described functions, the video signal processor 66 also performs the adjustment of contrast, brightness and color under the control of the television microcomputer 58.

The second selector 68 selectively switches the RGB signal output from the information processing unit 50 or the RGB signal output from the video signal processor 66 in accordance with the control signal BLANK output from the information processing unit 50 to display the switched signal on the screen in the form of the information signal, television signal or television plus information signal.

The CRT driver 72 drives the CRT 70 in accordance with the horizontal and vertical sync signals (H/V) separated in the video signal processor 66. The deflector 74 supplies a deflecting current signal for correcting convergence to the CRT 70 in accordance with the horizontal and vertical sync signals (H/V) separated in the video signal processor 66.

The sound signal processor 76 processes the IF sound signal output from the IF amplifier 62 to output the left and right sound signals of the television signal. The sound signal processor 76 controls volume to mute the television sound signal under the control of the television microcomputer 58.

The third selector 78 selects the sound signal output from the information processing unit 50 or the sound signal output from the sound signal processor 76 in accordance with the control signal SND SW output from the information processing unit 50 to output the selected signal via the speaker 80.

In other words, in the case of the television mode, the third selector 78 outputs the television sound signal output from the sound signal processor 76 to the speaker 80. In the case of the communication mode, the third selector 78 outputs the sound signal output from the information processing unit 50. However, if the television mode is converted into the communication mode, the television sound signal output from the information processing unit 50 may be output as it is, or the sound signal for background music may be output. All sound signals may be programmed to be muted.

FIG. 3 is a block diagram of the information processing unit according to an embodiment of the present invention, shown in FIG. 2.

In FIG. 3, the information processing unit 50 includes a CPU 100 for controlling the overall system and carrying out the data transmission and operations using the program stored in a program ROM 110. The program ROM 110 stores the program necessary for system control and various other kinds of data. A main controller 200 generates a control signal necessary for the operation of the overall system and for carrying out information data reception and display control and graphic data processing. A RAM/DAC 230 has a palette RAM for converting screen pixel data processed by the main controller 200 into RGB data and a digital-to-analog converter (DAC) for converting the RGB data read from the palette RAM into an analog signal. A volatile memory 210 reads/writes data received under the control of the main controller 200. A storage memory 220 reads and writes the data stored in the volatile memory 210 under the control of the main controller 200, and a modem 300 receives and transmits data to and from a host computer (not shown) via a telephone line under the control of the main controller 200.

Now, the operation of the information processing unit shown in FIG. 3 will be described with reference to FIG. 2.

In FIG. 3, the CPU 100 controls the overall system and carries out the data transmission and operations using the program stored in a program ROM 110 in accordance with the control signal generated from the main controller 200.

Data processing by the CPU 100 for peripheral function blocks is performed by interrupt signals, and the interrupt signals necessary for controlling the system CPU 100 are performed by the main controller 200. The interrupt signals are generated by the modem 300 and various tasks in the main controller 200.

Some examples of the tasks in the main controller 200 are the reception of an infrared signal input via the infrared signal receiver 56 in accordance with the input of keys installed in the transmitter 54, a vertical blanking, the operation of an internal timer for a predetermined function and the input of serial data from the television microcomputer 58. At this time, the main controller 200 generates the interrupt signal to be transmitted to the CPU 100.

The CPU 100 processes the corresponding task whenever the interrupt signal is generated by the main controller 200.

The program ROM 110 stores a program necessary for system operation, font data, various kinds of decoding programs and data. The CPU 100 reads data from the program ROM 110 to execute a group of operations therefor.

In other words, if a communication mode key is input, the main controller 200 recognizes the input to transmit the interrupt signal to the CPU 100 and then the CPU 100 performs the communication mode according to the program of the program ROM 110.

The data for the telephone number according to the key input is recognized by the main controller 200 which is then transmitted to the CPU 100. The CPU 100 transmits the telephone number to the modem 300. Then, the modem 300 connects the information processing unit 50 to the value added network.

When the line is connected, a communication item is input using the transmitter 54. If the data corresponding to the communication item is transmitted to the host computer 30 via the modem 300, the host computer 30 transmits the information data according to the communication item.

When the information data received via the modem 300 is demodulated and then applied to the main controller 200, the main controller 200 stores the data in a predetermined region of the volatile memory 210 and then reads the graphic signal for an information picture display, synchronized with the horizontal and vertical sync signals (H/V) output from the volatile memory 210, to then be applied to the RAM/DAC 230. The RAM/DAC 230 converts the applied signal into an analog signal and outputs the converted signal to the first selection port a2 of the second selector 68.

The main controller 200 generates a control signal necessary for the overall system and controls the write/read operations of the volatile memory 210 and storage memory 220.

In other words, the main controller 200 receives the horizontal and vertical sync signals (H/V) generated in the video signal processor 66 for attaining the synchronization with the external video sync signal.

The main controller 200 receives the infrared data corresponding to the key input of the transmitter 54 via the infrared signal receiver 56 to then transmit the same to the CPU 100, transmits the interrupt signal generated by the aforementioned internal tasks to the CPU 100, recognizes the interrupt signal generated in the modem 300 to notify the CPU 100 of the interrupt signal, controls the graphic and video data processing and transmits the graphic data to the RAM/DAC 230.

The main controller 200 supplies the composite sync signal $C_{sync}$ generated by the internal sync signal generator to the first selection port a1 of the first selector 64. Also, the main controller 200 supplies the control signal GR SW for controlling the first selection port a1 of the first selector 64 to which the composite sync signal $C_{sync}$ is input to be selected in the case of displaying the information signal entirely on the screen, and for controlling the second selection port b1 to which the IF video signal output from the IF amplifier 62 to be selected in case of displaying the television signal or television plus information signal on the screen.

The main controller 200 supplies a control signal BLANK to the selection control port of the second selector 68, such that the first selection port a2 of the second selector 68, which inputs the RGB data of is the RAM/DAC 230, is selected in the case of displaying an information signal entirely on the screen. The second selection port b2, which inputs the RGB data output from the video signal processor 66, is selected in the case of displaying a television signal on the screen. In the case of displaying a superimposed television plus information signal on the screen, the first selection port a2 is selected only in the information data display section and the second selection port b2 is selected in the other section.

The main controller 200 outputs a control signal SND SW to the selection control port of the third selector 78 such that the second selection port b3, which inputs the television sound signal processed in the sound signal processor 76, is selected in case of a television mode, and the television sound signal is muted in case of a communication mode. According to a first embodiment of the information processing unit, a separate sound signal for a communication mode is not input to the first selection port a3 of the third selector 78.

Here, when the television mode is converted into the communication mode, the second selection port b3 of the third selector 78 is selected to output the television sound signal.

Also, the main controller 200 converts parallel data of a byte unit output from the CPU 100 into serial data for the interface between the CPU 100 and the television microcomputer 58 to transmit the serial data to the television microcomputer 58, and converts the serial data received from the television microcomputer 58 into the parallel data of a byte unit to transmit the parallel data to the CPU 100.

The volatile memory 210 and the storage memory 220 which are readable/writable memories, respectively, store the communication data. Here, the volatile memory 210 has a data storage region and a video refreshment region. In the data storage region, the information data of a screen is stored in the data storage region. The video refreshment region is used for superimposing the information data on the television signal. In other words, the information data stored in the video refreshment region corresponds to the superimposing position and then the stored data is read by the main controller 200 having the graphic processing function to then display the same on the CRT 70 via the RAM/DAC 230.

The RAM/DAC 230 stores the color data to be displayed on the screen in the internal palette RAM. The color data is written to the palette RAM under the control of the CPU 100, and when pixel data is transmitted from the main controller 200, the RGB color data of the corresponding palette RAM are read and converted into analog signals to be output.

The modem 300 demodulates a modulated signal received through the phone line 40 to decode the demodulated signal for error correction and then stores the data in an internal buffer, generates and transmits an interrupt signal to the CPU 100 such that the received data is stored in the volatile memory 210. Also, the modem 300 receives the digital data to be transmitted from the CPU 100, and modulates and transmits the received data to the host computer 30 via the phone line 40.

The modem 300 connected to the phone line 40 and the telephone 52 detects whether the phone is on or off the hook and detects key tones and transmits a key number to the CPU 100. Also, the modem 300 detects key tone information input via the phone line 40 and decodes the same to then transmit the corresponding data to the CPU 100.

Figure 4A:
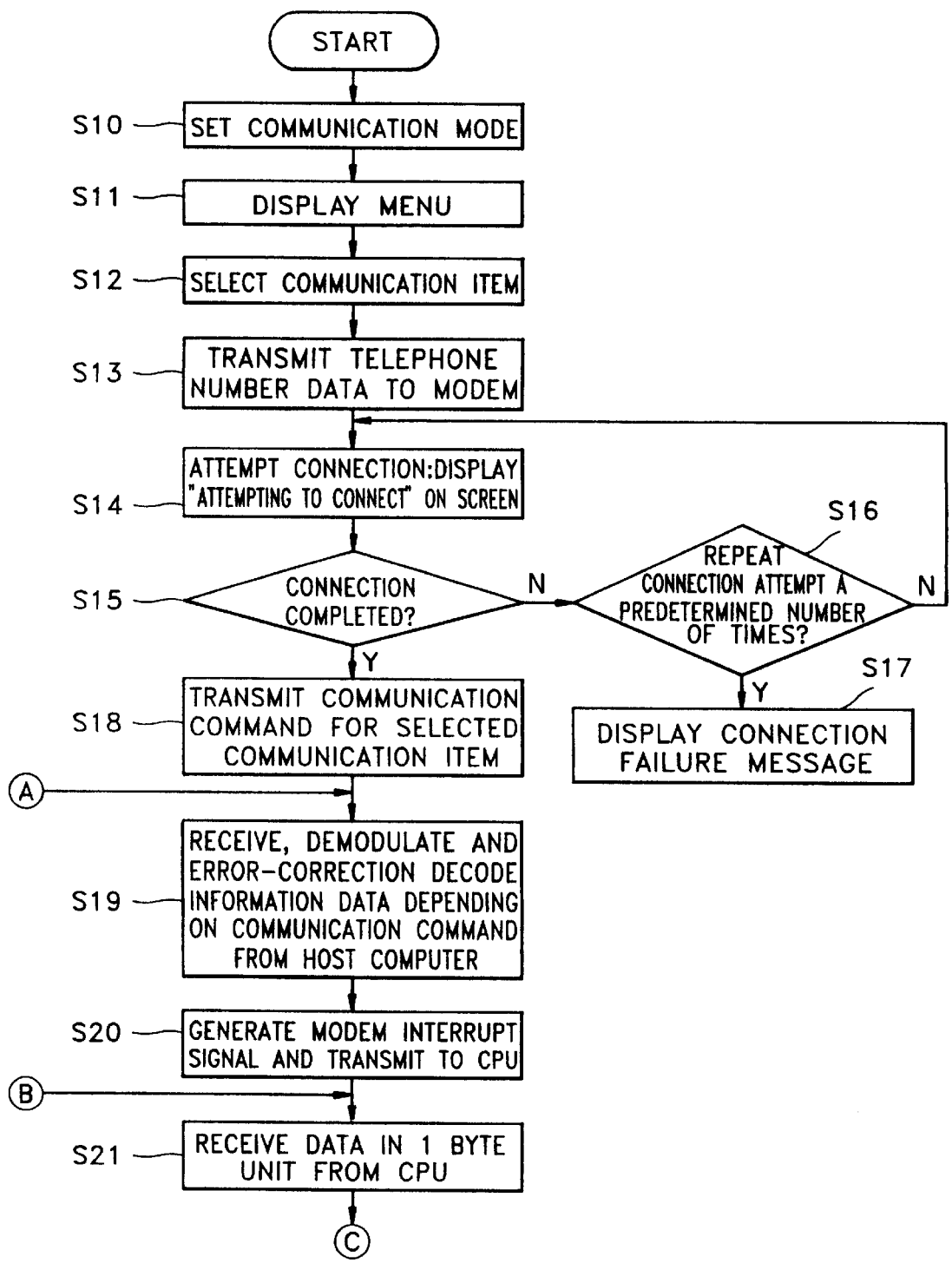
FIGS. 4A-4B illustrate a flowchart of an information data processing method performed by a CPU shown in FIG. 2.
Figure 4B:
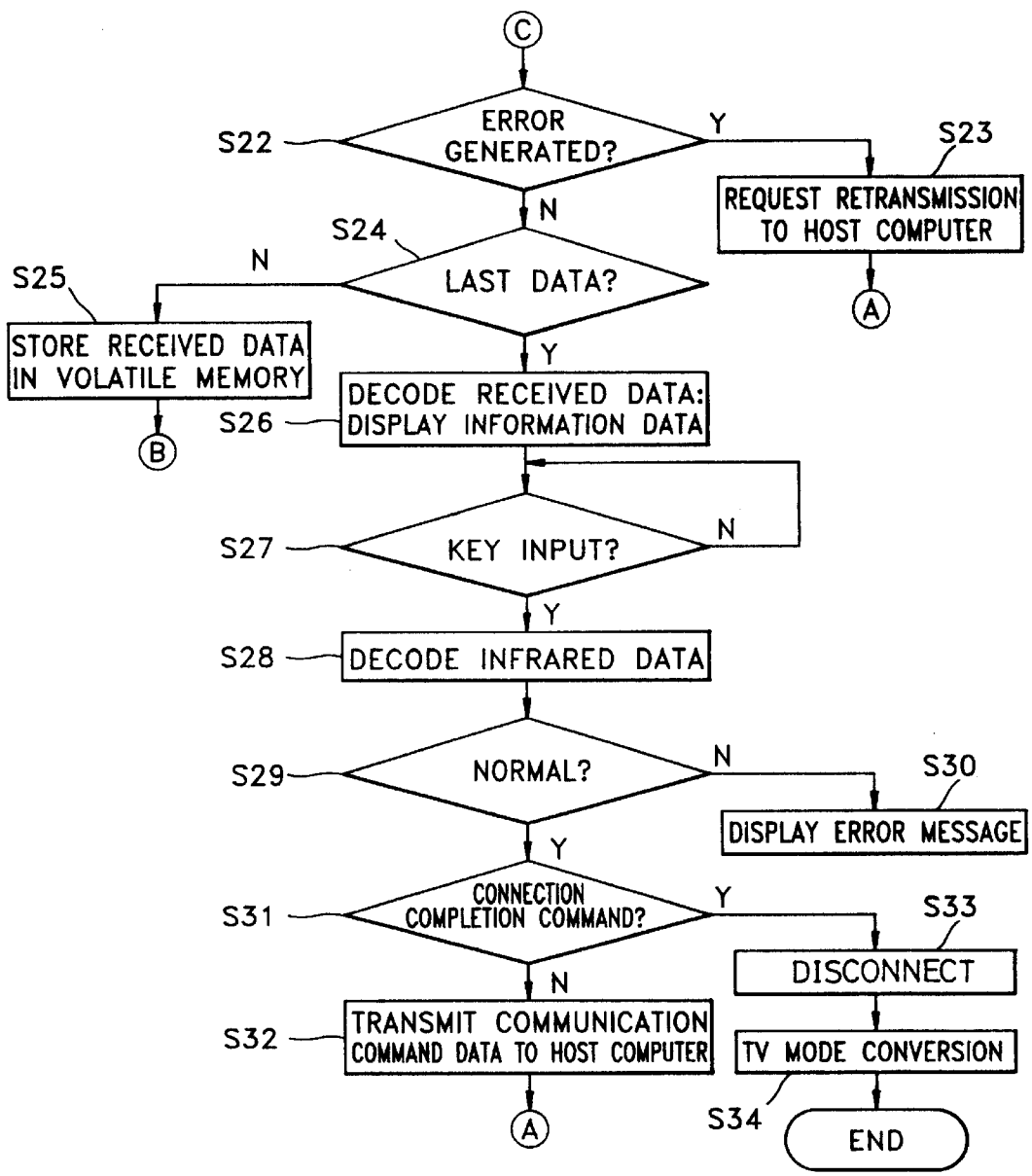

FIGS. 4A–4B illustrate a flowchart outlining the data processing method performed by the CPU shown in FIG. 3, which will be explained with reference to FIGS. 2 and 3.

In FIG. 4A, the CPU 100 sets a communication mode corresponding to a key input of the transmitter 54 (step S10).

If the communication mode is set, a menu screen for communication options is displayed (step S11) and a desired communication option among the displayed communication options is selected using a function key or number key of the transmitter 54 (step S12).

If the communication option is selected, a telephone number is input using the number keys of the transmitter 54 for connection with the VAN (host computer). Then, the main controller 200, having recognized the telephone number, generates the interrupt signal to transmit the same to the CPU 100. The CPU 100, having received the interrupt signal, transmits the telephone number data to the modem (step S13). The modem 300 dials the received telephone number to make connection with the host computer 30 (step S14).

At this time, when the connection with the host computer 30 is in progress, the main controller 200 displays the message "attempting to connect" on a part of the television screen via the RAM/DAC 230 so that the user may recognize the connection with the VAN being offered with a communication service.

The main controller 200 having a graphic processing function stores the message "attempting to connect" in the video refresh region of the volatile memory 210, and reads the data stored in synchronization with the horizontal/vertical sync signals (H/V) output from the video signal processor 66 to output the read data to the RAM/DAC 230. The RAM/DAC 230 converts the read graphic data into an analog RGB signal to display the message on the CRT 70.

It is determined whether a line connection with the host computer 30 is completed (step S15). If the line is not connected, the attempt to connect is repeated a predetermined number of times (step S16). If the line is not connected after the predetermined number of attempts, a connection failure message is displayed on a predetermined region of the television screen (step S17).

If the connection is completed, the communication command for the selected communication item is transmitted to the host computer 30 via the modem 300 (step S18). The modem 300 receives information data in accordance with the communication command from the host computer 30 at a predetermined reception speed, demodulates and error-correction decodes the received data, and stores the same in the internal buffer (step S19)

The modem 300 stores the error-correction decoded data in the internal buffer. Then, if the buffer is full, the interrupt signal is generated and transmitted to the CPU 100 (step S20).

The CPU 100, having recognized the interrupt signal, receives data from the modem 300 in the unit of 1 byte (step S21).

It is determined whether an error is generated in the received data (step S22) (See FIG. 4B). If an error is generated in the received data, retransmission of the data is requested to the host computer 30 via the modem 300 (step S23) and the process is fed back to step S19.

If there is no error, it is determined whether the data transmitted via the modem 300 is the last data (step S24).

If the transmitted data is not the last data, the received data is written in the storage region of the volatile memory 210 of the CPU 100 (step S25) and then the process is fed back to step S21 to continuously receive data from the host computer 30 via the modem 300.

However, if the data read from the modem 300 is the last data, i.e., if the data reception is completed, the received data is processed (step S26).

The data processing is performed such that the received data is read from the volatile memory 210 and stored in the storage memory 220 under the control of the main controller 200 and the data stored in the storage memory 210 is read to then be applied to the RAM/DAC 230 as graphic data.

The graphic data in the RAM/DAC 230 is output to the CRT 70 as an RGB signal to be displayed on the screen.

The RGB signal output from the RAM/DAC 230 is displayed on the entire screen under the control of the main controller 200 or is selectively switched together with the television signal output from the video signal processor 66 to be superimposed on a predetermined region of the television signal for display.

In other words, when the information content is displayed, only the information content may be displayed on a blue background screen with the television signal completely blocked. Otherwise, the information content may be superimposed on the screen with television information.

While the information content is displayed, it is continuously determined whether there is a key input from the transmitter 54 (step S27). If there is a key input from the transmitter 54, the key data is decoded (step S28) to check whether the key data is normal (step S29).

If the key data of the transmitter 54 is not normal, an error message is displayed on the screen (step S30). If the key data is normal, it is determined whether the key data is a communication completion command (step S31).

If the key data is not the communication completion command, the key data is a communication control command. The communication control command is transmitted to the host computer (step S32). If the key data is the communication completion command, the line is disconnected (step S33) and the television screen reverts to the state that it was in prior to the communication mode and then the program for the communication mode is completed (step S34).

Figure 5:
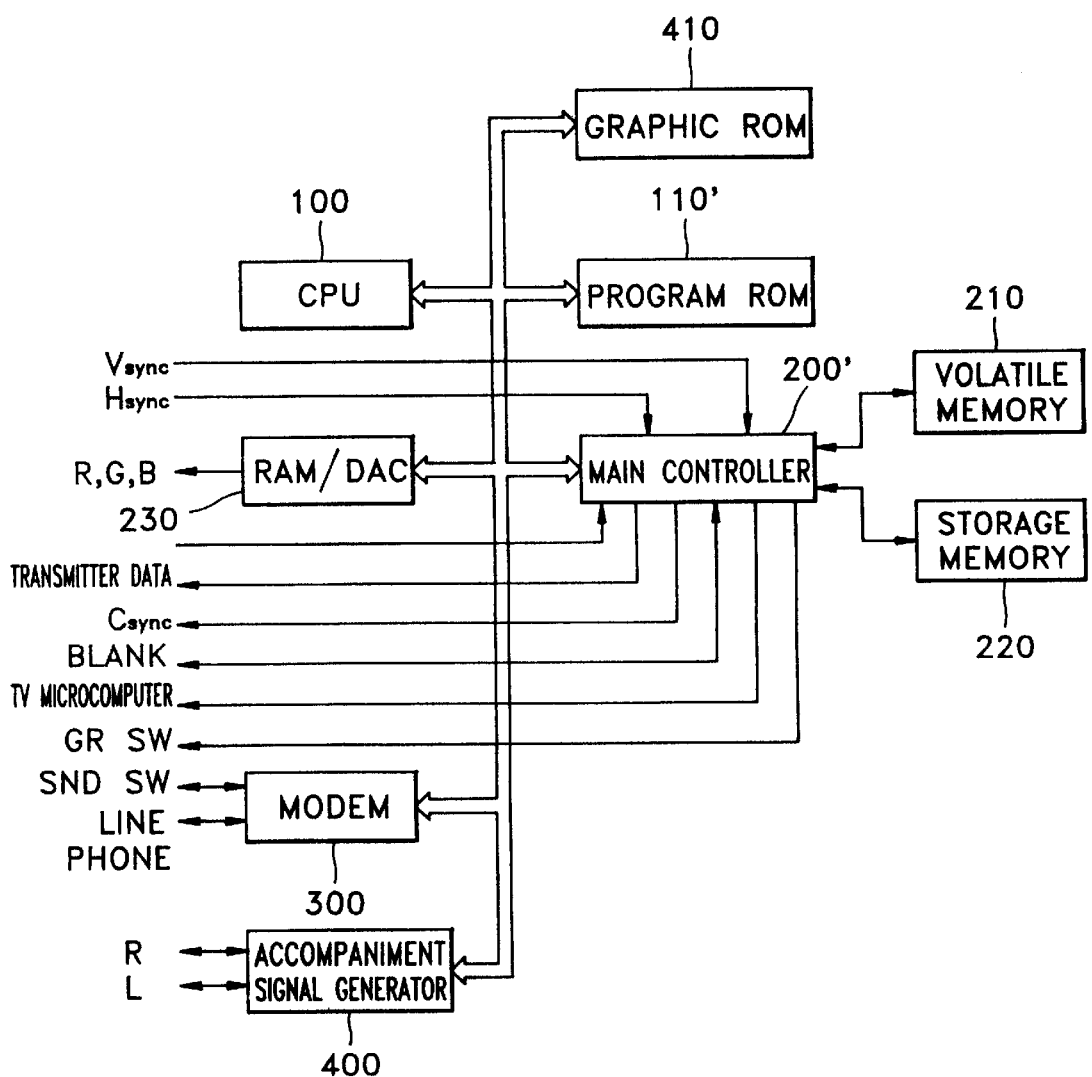
FIG. 5 is a detailed block diagram of an information processing unit shown in FIG. 2 according to another embodiment of the present invention.

FIG. 5 is a circuit diagram of the information processing unit shown in FIG. 2 according to another embodiment of the present invention. In FIG. 5, those parts which are the same as those corresponding parts of the information processing unit shown in FIG. 2 are designated by the same reference numerals, and their description will be omitted.

Referring to FIG. 5, the program ROM 110' includes a program for performing a communication karaoke function as well as the functions explained with reference to FIG. 3.

In addition to the functions described in connection with FIG. 3, a main controller 200' controls a graphic ROM 410, transmits data of a musical instrument digital interface (MIDI) format and commands to an accompaniment signal generator 400, receives lyric (song) data and stores it in a volatile memory 210, and then continuously moves the song data to a storage memory 220 to be stored therein if the song data is completely received. The storage memory 220 does not lose the data even during a power-off and is capable of storing approximately 30 songs.

The accompaniment signal generator 400 receives various commands and MIDI data from the main controller 200' in a serial data format and generates an accompaniment signal and outputs it to a first selection port a3 of the third selector 78. The accompaniment signal generator 400 stores the accompaniment signal of the MIDI data format depending on sound length, sound power and sound quality.

The graphic ROM 410 stores the compressed graphic data used as a background picture of the screen when the communication karaoke mode is selected. The CPU 100 reads the graphic data of the graphic ROM 410 and transmits it to the main controller 200' to display a graphic image suitable to the song lyric according to the scenario information obtained by tabulating the homologous relationship between lyric contents among the data received from the host computer 30 and background graphics.

The main controller 200' writes the graphic data in the video refresh region of the volatile memory 210, reads the written graphic data according to the horizontal and vertical sync signals (H/V) output from the video signal processor 66 to then transmit the same to a RAM/DAC 230. The RAM/DAC 230 outputs the graphic data as an analog RGB signal and displays it on the CRT 70.

The operation of the information processing unit having the aforementioned configuration will now be described in terms of the communication karaoke function with reference to FIG. 6.

The communication karaoke function allows a user to sing a desired song with the accompaniment by outputting a desired accompaniment and lyric data (hereinafter referred to as song data) transmitted from the host computer 30.

For this purpose, the communication karaoke mode must first be set. The communication karaoke mode may be selected from the main menu screen of the information service using number keys. Alternatively, the communication karaoke mode may be selected by pressing a karaoke mode key separately provided in the transmitter 54.

The first method is to display the main menu screen by inputting the communication mode key and then to select a karaoke option as one of the sub-menu options, from the main menu. The second method is to directly press the karaoke mode key for selection, whereby the line of the host computer 30 is connected to a karaoke service when the karaoke mode is selected.

Here, a line connection implies a state in which data transmission and reception are allowed by calling up a predetermined VAN operator and connecting the line with the host computer 30.

If the communication karaoke mode is selected to connect the line, the user makes a reservation of a desired song number. The song number of the reserved song is input using number keys of the transmitter 54, and multiple song numbers may be input as well. The song number input by the user is provided to the user in advance in the form of a pamphlet listing song numbers corresponding to available songs. New songs are continuously input to the host computer 30, and a pamphlet containing new song information is periodically distributed to the user (typically once each month). The user inputs his or her desired song number from the distributed pamphlet.

When the user inputs the desired song number, the host computer 30 transmits the selected song data and the modem 300 receives, demodulates and error-correction decodes the selected data to then store the same in the internal buffer.

The song data, error-correction-decoded by the modem 300, is read from the main controller 200' and stored in the volatile memory 210. The data is continuously stored in the storage memory 220 and when the storage for one song is completed, the stored data is decoded.

The graphic data stored in the graphic ROM 410 as the decoded scenario information is read and output as the background picture, and the decoded MIDI data is output to the accompaniment signal generator 400 which then outputs accompaniment music.

At this time, the song lyric is output prior to the background picture so as to be displayed on a part of the background picture.

During the communication karaoke mode, the song data for one song is received in one byte units whenever the modem interrupt signal is generated. If the song data for one song is received without error and is completely stored in the data storage region of the volatile memory 210, the data stored in the volatile memory 210 is moved to the storage memory 220 and stored therein.

The intelligent television receiver provided with the communication karaoke function receives song information supplied by the VAN operator, displays it on the screen and outputs accompaniment music so that the user can sing the song.

The information data processing method for the communication karaoke mode will be described with reference to FIG. 6.

Figure 6:
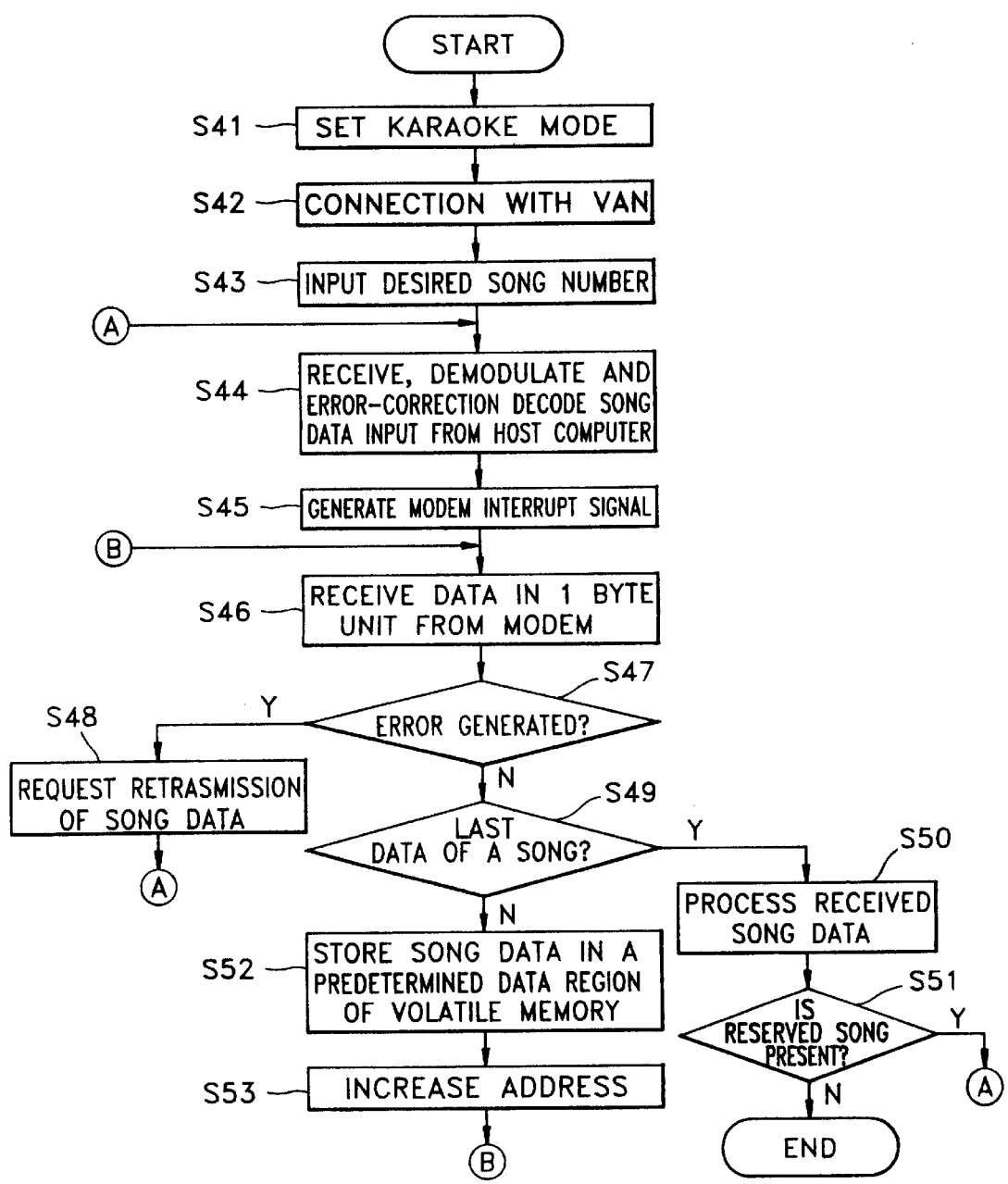
FIG. 6 is a flowchart of an information data processing method for a karaoke mode according to an embodiment of the present invention, performed by a CPU shown in FIG. 5.

FIG. 6 is a flowchart of an information data processing method for a karaoke mode according to an embodiment of the present invention, shown in FIG. 5.

In FIG. 6, if a karaoke mode is set by a key input of the transmitter 54 (step S41), the VAN is connected (step S42). Here, the connecting step (step S42) includes substeps S13 through S17, as shown in FIG. 4A.

If the VAN is connected, a desired song number is input (step S43).

When the song number is input, the modem 300 receives song data for the song selected from the host computer 30, demodulates and error-correction decodes the received song data and stores it in the internal buffer (step S44).

At this time, the host computer 30 counts the fee for transmission of each song data and charges the service fee to the user's account.

The modem 300 generates a modem interrupt signal if one song data is completely stored in the internal buffer (step S45).

The CPU 100, having recognized the modem interrupt signal, reads song data in one byte units from the modem 300 (step S46).

It is determined whether an error is generated in the song data while reading one song data from the modem 300 (step S47).

If it is determined that an error is generated in the song data received in step S47, retransmission of the error-bearing song data is requested (step S48) and the process is fed back to step S44 for receiving song data from the host computer 30.

If it is determined in step S47 that the song data is received without error, it is determined whether the song data is the last data (step S49).

If the song data is the last data, which means a completed state of data reception of one song, the received song data is processed (step S50). If there is no reserved song, that is, if the user selects only one song, the connection with the VAN is disconnected. If there is a reserved song, the transmitted song data is read out in the unit of one byte (steps S50 and S51).

If the received song data is not the last data, the read data is stored in a predetermined region of the volatile memory 210 (step S52) and the address is increased (step S53) to then continuously store song data.

Here, the song data is sequentially stored in the volatile memory 210 whenever the data is received without error in one byte units.

If the data storage for one song is completed, the main controller 200 reads the song data stored in the volatile memory 210, moves the song data to the storage memory 220 for storage, decodes the stored data, outputs the decoded MIDI data as the accompaniment music via the accompaniment signal generator 400 and reads the graphic data stored in the graphic ROM 410 as the decoded scenario information to then output the same as the background picture.

Here, the reason why the data stored in the volatile memory 210 is moved to the storage memory 220 to then be stored therein is as follows:

First, since much time is required for storing the received song data in the storage memory 220, the song data is temporarily stored in the volatile memory 210 and is then moved and stored during each time interrupt. Here, the time interrupt is generated by an internal timer of the main controller 200.

Second, during a power outage, the stored data is not lost.

Third, many favorite songs stored in the storage memory 220 can be directly read therefrom and output, rather than receiving the songs in the communication mode. This storage depends on the storage capacity of the memory 220.

During the operation of moving the song data from the volatile memory 210 to the storage memory 220 and storing it therein, transmission of a reserved song is requested from the host computer 30 via the modem. When the data is received in the modem 300 from the host computer 30, the modem 300 generates and transmits an interrupt signal to the main controller 200 to allow the CPU 100 to read the received data.

Therefore, the reserved song can be played immediately after a previous song is finished, which allows real time service.

In other words, after the reception of song data for a requested song is completed, if another song is reserved while the previously requested song is being played, the data of the reserved song is continuously received and stored in the volatile memory 210. Then, when the reception of the reserved song is completed, the song is moved to and stored in the storage memory 220. In this manner, once the play of the song is completed, the next reserved song can be played immediately.

Here, if the reception of all reserved songs is completed and the songs are stored in the storage memory 220, the communication mode connection is terminated to suppress unnecessary VAN service fee payment.

Therefore, according to the present invention, in a state where the intelligent television receiver is connected to the VAN, the communication karaoke function is performed. Also, in a state where the connection with the VAN is terminated, the karaoke function for reserved songs can be performed.

Figure 7:
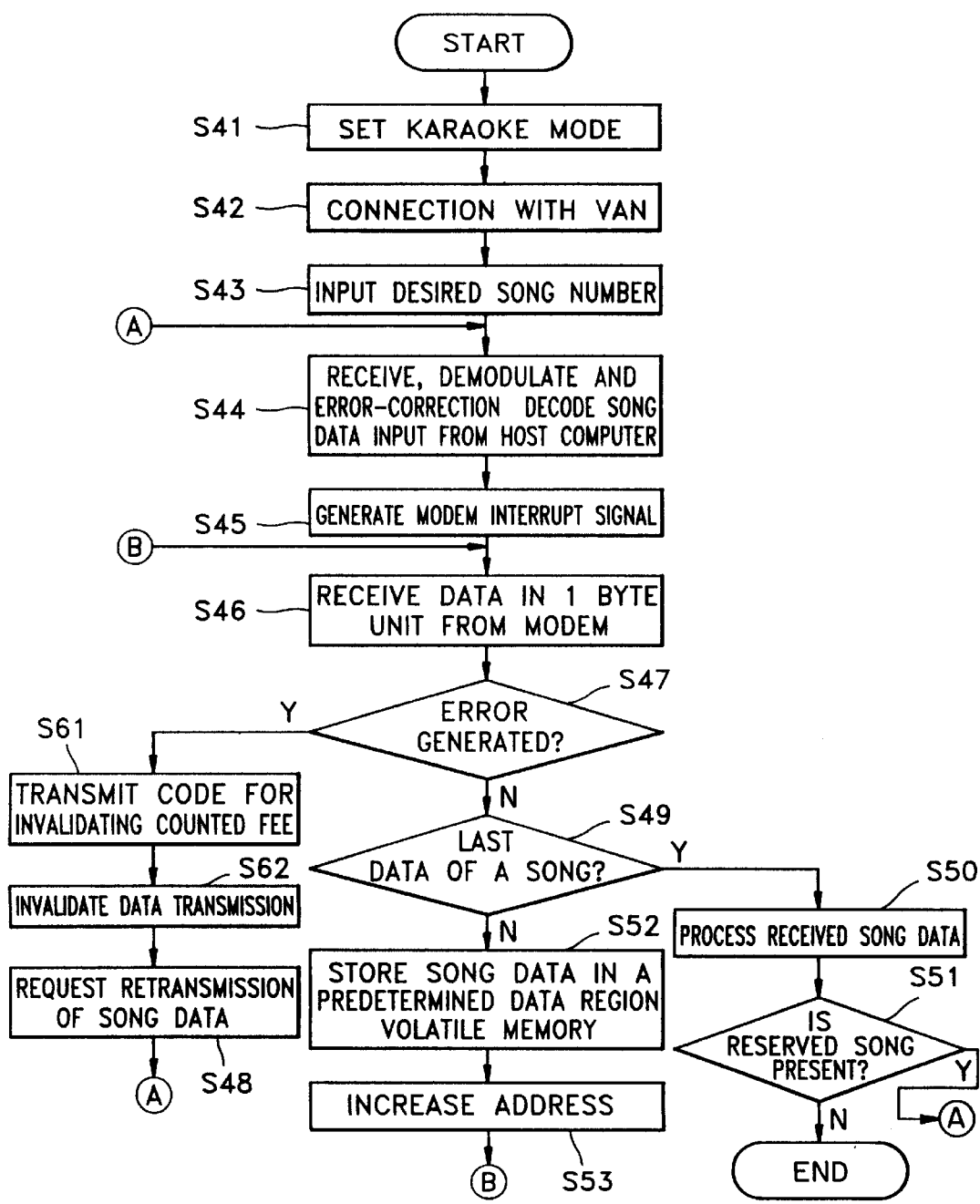
FIG. 7 is a flowchart of an information data processing method for a karaoke mode according to another embodiment of the present invention, performed by a CPU shown in FIG. 5.

FIG. 7 is a flowchart of an information data processing method for a karaoke mode according to another embodiment of the present invention, shown in FIG. 5.

During a communication karaoke mode, the VAN operator typically charges the service charge to the user wherein the service charge is calculated on a payment basis for each song reception.

However, when the user's selected song data is transmitted from the host computer to the intelligent television receiver, errors may be generated by internal or external sources. If errors are generated during reception of the song data, the song data cannot be decoded or reproduced. Thus, the retransmission of the song data must be requested.

Here, since the VAN operator charges the transmission fee whenever a song data is transmitted, even if the song data is not accurately received due to the error, the user should pay the transmission fee.

The flowchart of FIG. 7 further comprises the steps S61 and S62 for eliminating the need to pay the transmission fee for the song data when an error in the song data is generated. The features will now be described in detail.

In FIG. 7, when an error occurs in the song data read in a byte unit from the modem 300 in step 46, the main controller 200 transmits a code signal for invalidating the counted fee to the host computer (step S61).

In other words, if the error transmitted from the host computer 30 is generated in the song data, a counted fee invalidating code signal for canceling the transmission fee for the requested but error-bearing song is transmitted from the main controller 200 to the host computer 30 via the modem 300.

If the counted fee invalidating code signal is transmitted to the host computer 30, the host computer 30 cancels the transmission fee of the error-bearing song from the counted transmission fee (step S62).

After the counted fee invalidating code signal is transmitted, retransmission of the song is requested and the process is fed back to step S44 (step S48).

Figure 8:
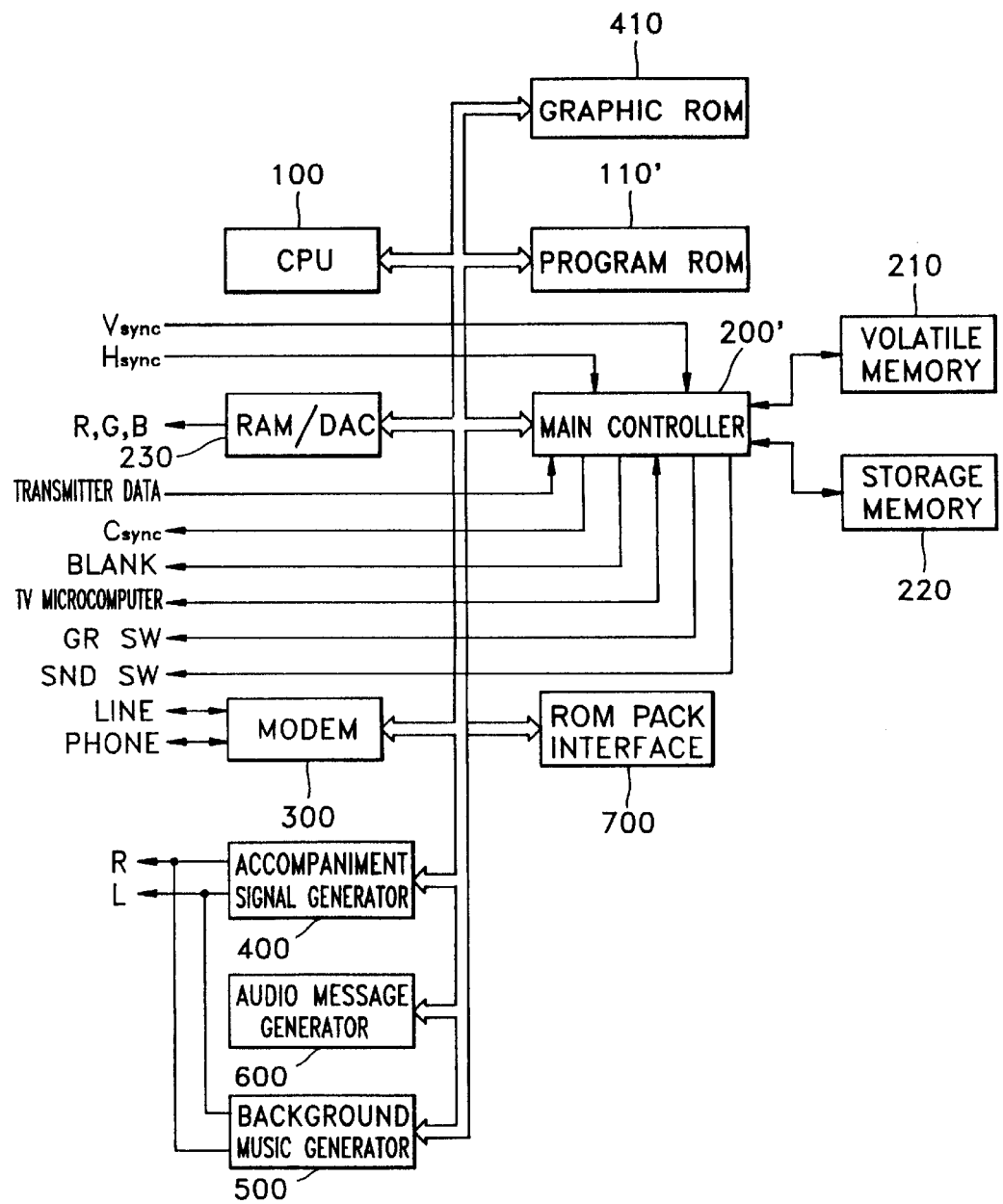
FIG. 8 is a detailed block diagram of an information processing unit shown in FIG. 2 according to still another embodiment of the present invention.

FIG. 8 is a detailed block diagram of an information processing unit according to still another embodiment of the present invention, shown in FIG. 2, in which the same components as those of the information processing unit shown in FIG. 5 are designated by the same reference numerals and the explanation thereof will be omitted herein.

In FIG. 8, the background music generator 500 controls the operation of the main controller 200' under the control of the CPU 100. If the mode is converted into a communication mode so that the television screen is changed to the communication screen, the television sound signal is blocked and a sound signal for quiet background music is generated.

If the information screen is displayed during the converted communication mode, the main controller 200' generates the control signal SND SW to mute the television sound signal, and controls the first selection port a3 of the third selector 78 for receiving the background music generated in the background music generator 500 as the sound signal to be selected.

At this time, the background music generator 500 is constituted by a one-chip ROM and controller. Here, a music program and data are stored in the ROM. Also, the controller allows real-time control.

Therefore, if the information is displayed in the communication mode, the background music generator 500 outputs quiet background music, instead of the television sound signal.

In other words, when the information screen is displayed, either a television sound signal or background music may be heard. Thus, when the information screen is converted, the television sound signal or background music is selectively used by the user.

The audio message generator 600 has a functional element necessary for a call automatic response mode and transmits an audio message representing "user not home". In other words, the user selects the automatic response function so that a "user not home" guiding message is transmitted for the incoming call received when the user is not home.

In a state where the automatic response function is selected, the modem 300 counts the number of rings and transmits the result to the main controller 200'. If the phone rings a predetermined number of times, the main controller 200' transmits the interrupt signal to the CPU 100.

If the interrupt signal is input, the CPU 100 drives the audio message generator 600 via the main controller 200'. The "user not home" guiding audio signal stored in the audio message generator 600 is transmitted to the modem 300 to then be transferred to the caller.

Therefore, if there is an incoming call received when the user is not home in a state where the automatic response function is selected, the audio message is automatically transmitted to the caller. When the automatic response function is not necessary, it is disabled so that the user can pick up the telephone directly.

A ROM pack interface 700 is a socket for a later function extension, to which terminals for transmitting and receiving data of the CPU 100, an address signal and various control signals are connected.

The ROM pack inserted into the ROM pack interface 700 is constituted by a ROM and a storage memory. If the ROM pack is externally installed, the main controller 200' detects and notifies the CPU 100 of the external ROM pack installation.

After recognizing the ROM pack installation, the CPU 100 reads a ROM header data of the ROM pack, analyzes functions of the corresponding ROM, moves the program region related thereto to the ROM pack and performs the functions stored in the ROM pack.

Therefore, the functions which have not been described in the embodiments of the present invention can be effected by performing the functions stored in the ROM pack via the ROM pack interface 700.

As described above, according to the present invention, an information communication service can be rendered using a television without a personal computer.

Also, a desired song can be transmitted at any time to allow a karaoke mode to be enjoyed at home, by incorporating a communication karaoke function into the intelligent television receiver according to the present invention.

Further, if an error is generated in song data received during a karaoke mode, the transmission fee for the corresponding song is not counted to prevent imposition of an unfair charge to the user.

When the mode is converted from a television mode to a communication mode, the present invention provides various functions, e.g., a background music output or an audio message output.

Also, the present invention allows functions to be extended by installing a ROM pack interface to insert a ROM pack having a function extension program.

What is claimed is:

1. An intelligent television receiver, operable with a value added network (VAN), for receiving a signal of a desired channel and displaying the signal on a CRT, said intelligent television receiver comprising:

a modem for transmitting and receiving information data according to connection command data when the intelligent television receiver is connected with the VAN via a communication cable; and an information processing unit for outputting said connection command data if a communication mode is set in the intelligent television receiver, for decoding said information data transmitted from the VAN to said modem to display said information data on the CRT, and for transmitting command data necessary for the transmission and reception of said information data to said modem.

2. An intelligent television receiver, operable with a value added network (VAN), for receiving a signal of a desired channel and displaying the signal on a CRT, said intelligent television receiver comprising:

a tuner for converting a radio frequency (RF) signal of the desired channel received via an antenna into an intermediate frequency (IF) signal;

an IF amplifier for amplifying said IF signal to output the amplified signal as an IF video signal and an IF sound signal;

a modem for transmitting and receiving information data according to connection command data when the intelligent television receiver is connected with the VAN via a communication cable;

an information processing unit for outputting said connection command data if a communication mode is set in the intelligent television receiver, for generating first through third control signals according to at least one of a television and communication mode set in the intelligent television receiver, for generating a composite sync signal synchronized to said information data, for decoding said information data transmitted from said modem to output the information data as an information video signal and an information sound signal as background music in case the communication mode is set in the intelligent television receiver;

a television microcomputer for generating a mode control signal for signal processing in the television receiver in accordance with a user input, and for transmitting the mode control signal to said information data processing unit and for receiving data from said information processing unit;

a first selector for selecting one of: a) the composite sync signal output from said information processing unit and b) the IF video signal output from said IF amplifier in accordance with the first control signal generated by said information processing unit;

a video signal processor for processing the signal selected by said first selector to output a video signal and horizontal and vertical sync signals;

a second selector for selecting one of: a) the information video signal output from said information processing unit and b) the video signal output from said video signal processor in accordance with the second control signal generated by said information processing unit;

a CRT driver for driving said CRT in accordance with said horizontal and vertical sync signals output from said video signal processor;

a sound signal processor for processing said IF sound signal; and a third selector for selectively outputting one of: a) the information sound signal output from said information processing unit and b) the IF sound signal output from said sound signal processor in accordance with the third control signal generated by said information processing unit.

3. An intelligent television receiver as claimed in claim 2, wherein said third selector mutes all sound signals if the mode control signal corresponds to the communication mode.

4. An intelligent television receiver as claimed in claim 2, wherein said third selector selects the information sound signal output from said information processing unit in both television and communication modes.

5. An intelligent television receiver, operable with a value added network (VAN), for receiving a signal of a desired channel and displaying the signal on a CRT, said intelligent television receiver comprising:
  a tuner for converting a radio frequency (RF) signal of the desired channel received via an antenna into an intermediate frequency (IF) signal;
  an IF amplifier for amplifying said IF signal to output the amplified signal as an IF video signal and an IF sound signal;
  an information processing unit for recognizing a mode of the intelligent television receiver, for receiving information data of a graphic or text state and decoding the information data, said information processing unit comprising;
    a program ROM in which programs and data necessary for the operation of said information processing unit are stored;
    a CPU for performing control of said information processing unit, data transmission and operations by said programs stored in said program ROM;
    a main controller for recognizing the mode set by a user and for generating connection command data, for generating first through third control signals, and for generating a composite sync signal synchronized with said information data, and having a graphic data processing function with respect to said information data;
    a RAM/DAC for receiving the graphic data of said main controller, for reading RGB data from an internal palette RAM, for converting the graphic data into an analog information signal and for outputting the graphic data to the CRT;
    a memory for reading and writing the information data under the control of said main controller; and
    a modem for transmitting and receiving information data according to the connection command data when the intelligent television receiver is connected with the VAN via a communication cable;
  a television microcomputer for generating a mode control signal in the television receiver corresponding to at least one of a communication mode and a television mode in accordance with a user input, and for transmitting the mode control signal to said information processing unit to and receiving data from said information processing unit;
  a first selector for selecting one of: a) the composite sync signal output from said information processing unit and b) the IF video signal output from said IF amplifier in accordance with the first control signal generated by said main controller;
  a video signal processor for processing the signal selected by said first selector to output an RGB signal and horizontal and vertical sync signals;
  a second selector for selecting one of: a) the analog information signal output from said information processing unit and b) the RGB signal from said video signal processor in accordance with said second control signal generated by said main controller;
  a CRT driver for driving said CRT in accordance with said horizontal and vertical sync signals output from said video signal processor;
  a sound signal processor for processing said IF sound signal; and
  a third selector for muting a sound signal output from said sound signal processor in the communication mode, and outputting said sound signal in case of the television mode in accordance with the third control signal generated by said main controller.

6. An intelligent television receiver as claimed in claim 5, wherein said information processing unit further comprises:
  a background music generator for generating background music; and
  wherein said third selector outputs said background music under the control of said main controller when the mode set by the user is the communication mode.

7. An intelligent television receiver as claimed in claim 5, wherein a telephone is connected to said modem via a second communication cable so that said modem detects whether said telephone is on or off hook, detects a key tone of said telephone, and transmits a key number to said CPU via said second communication cable.

8. An intelligent television receiver as claimed in claim 7, wherein said information processing unit further comprises:
  an audio message generator for generating a "user not home" guiding message under the control of said main controller if there is an incoming call when an automatic response function mode is selected by a user; and
  wherein said "user not home" guiding message of said audio message generator is transmitted to a caller via said modem.

9. An intelligent television receiver as claimed in claim 5, wherein said information processing unit further comprises:
  a ROM pack interface for interfacing a socket to which a data terminal, address signal terminal, and control signal terminal are connected with a ROM pack inserted into said socket; and
  wherein installation of said ROM pack is detected by said main controller and recognized by said CPU so that functions stored in said ROM pack are operable with said CPU.

10. An intelligent television receiver as claimed in claim 5, wherein said video signal processor processes the IF video signal and outputs the RGB signal, horizontal and vertical sync signals, if the signal selected by said first selector is the IF video signal, and filters the composite sync signal if said selected signal is the composite sync signal and outputs said horizontal and vertical sync signals to said main controller.

11. An intelligent television receiver as claimed in claim 5, wherein said memory includes a volatile memory and a storage memory and wherein if said volatile memory becomes full of data received through said modem, said data stored in said volatile memory is moved to and stored in said storage memory to allow real time processing of data received from said modem.

12. An intelligent television receiver as claimed in claim 5, wherein said main controller supplies the composite sync signal and the first control signal generated by an internal sync signal generator to said first selector, controls the composite sync signal to be selected in case of the communication mode, and controls the IF video signal to be selected in case of the television or television and communication mode.

13. An intelligent television receiver as claimed in claim 5, wherein said main controller supplies the second control signal to said second selector, controls the RGB data output from said RAM/DAC to be output on the entire screen of the CRT in the case of the communication mode, controls the RGB signal output from said video signal processor to be output on the entire screen of the CRT in case of the television mode, and controls the RGB data output from said RAM/DAC to be selectively displayed on a portion of the CRT in case of the television and communication mode.

14. An intelligent television receiver as claimed in claim 5, wherein said main controller supplies the third control signal to said third selector so that the IF sound signal processed by said sound signal processor is output during both television mode and communication mode.

15. An intelligent television receiver as claimed in claim 5, wherein said main controller communicates data between said CPU and said television microcomputer, and in communicating between said CPU and said television microcomputer, said main controller converts parallel data of a byte unit output from said CPU into serial data and transmits said serial data to said television microcomputer, and converts serial data received from said television microcomputer into parallel data of a byte unit and transmits said parallel data to said CPU.

16. An intelligent television receiver, operable with a value added network (VAN), for receiving a signal of a desired channel and displaying the signal on a CRT, said intelligent television receiver comprising:

a tuner for converting a radio frequency (RF) signal of the desired channel received via an antenna into an intermediate frequency (IF) signal;

an IF amplifier for amplifying said IF signal to output the amplified signal as an IF video signal and an IF sound signal;

an information processing unit for recognizing a mode of the intelligent television receiver, for receiving and decoding information data of a graphic or text state and for performing a karaoke function, said information processing unit comprising;

a program ROM in which programs and data necessary for the operation of said information processing unit and karaoke function are stored;

a CPU for performing control of said information processing unit, data transmission and operations by said programs stored in said program ROM;

a main controller for recognizing the mode set by a user for generating connection command data, and for generating first through third control signals, said main controller having an information data reception function, a display function and a graphic data processing function, said main controller decoding information data for the karaoke function and outputting the karaoke data as decoded scenery information and decoded MIDI data;

a RAM/DAC for receiving the graphic data of said main controller, for reading RGB data from an internal palette RAM, for converting the graphic data into an analog information signal and for outputting the graphic data to the CRT;

a memory for reading and writing the information data and karaoke data under the control of said main controller;

a modem for transmitting and receiving information data according to the connection command data when the intelligent television receiver is connected with the VAN via a communication cable;

a graphic ROM for compressing and storing the scenery information for the karaoke function; and an accompaniment signal generator for outputting said decoded MIDI data as an accompaniment signal;

a television microcomputer for generating a mode control signal in the television receiver corresponding to at least one of a television and a communication mode, said communication mode including a karaoke mode, in accordance with a user input and for transmitting the mode control signal to said information processing unit and for receiving data from said information processing unit;

a first selector for selecting one of: a) a composite sync signal output from said information processing unit and b) the IF video signal output from said IF amplifier in accordance with the first control signal generated by said main controller;

a video signal processor for processing the signal selected by the first selector to output an RGB signal and horizontal and vertical sync signals;

a second selector for selecting one of: a) the analog information signal output from said information processing unit and b) the RGB signal output from said video signal processor in accordance with the second control signal generated by the main controller;

a CRT driver for driving said CRT in accordance with said horizontal and vertical sync signals output from said video signal processor;

a sound signal processor for processing said IF sound signal; and a third selector for outputting said accompaniment signal output from said accompaniment signal generator in accordance with said third control signal in the case of said karaoke mode, and outputting said sound signal output from said sound signal processor in the case of the television mode.

17. An intelligent television receiver as claimed in claim 16, wherein said information processing unit further comprises:

a background music generator for generating background music;

wherein said third selector outputs said background music under the control of said main controller when the mode is converted into the communication mode.

18. An intelligent television receiver as claimed in claim 16, wherein a telephone is connected to said modem via a second communication cable so that said modem detects whether said telephone is on or off hook, detects a key tone of said telephone, and transmits a key number to said CPU via said second communication cable.

19. An intelligent television receiver as claimed in claim 18, wherein said information processing unit further comprises:

an audio message generator for generating a "user not home" guiding message under the control of said main controller if there is an incoming call when an automatic response function mode is selected by a user; and wherein said "user not home" guiding message of said audio message generator is transmitted to a caller via said modem.

20. An intelligent television receiver as claimed in claim 16, wherein said information processing unit further comprises:

a ROM pack interface for interfacing a socket to which a data terminal, address signal terminal, and control signal terminal are connected with a ROM pack inserted into said socket; and wherein installation of said ROM pack is detected by said main controller and recognized by said CPU so that functions stored in said ROM pack are operable with said CPU.

21. An intelligent television receiver as claimed in claim 16, wherein said video signal processor processes the IF video signal and outputs the RGB signal, and horizontal and vertical sync signals, if the signal selected by said first selector is the IF video signal, filters the composite sync signal if said selected signal is the composite sync signal and outputs said horizontal and vertical sync signals to said main controller.

22. An intelligent television receiver as claimed in claim 16, wherein said memory includes a volatile memory and a storage memory and wherein if said volatile memory becomes full of data received through said modem, said data stored in said volatile memory is moved to and stored in said storage memory to allow real time processing of data received from said modem.

23. An intelligent television receiver as claimed in claim 16, wherein said main controller supplies the composite sync signal and the first control signal generated by an internal sync signal generator to said first selector, controls the composite sync signal to be selected in case of the communication mode, and controls the IF video signal to be selected in the case of the television or television and communication mode.

24. An intelligent television receiver as claimed in claim 16, wherein said main controller controls the RGB data output from said RAM/DAC to be output on the entire screen of the CRT in the case of the communication mode, controls the RGB signal output from said video signal processor to be output on the entire screen of the CRT in the case of the television mode, and controls the RGB data output from said RAM/DAC to be selectively displayed on a portion of the CRT in case of the television and communication mode.

25. An intelligent television receiver as claimed in claim 16, wherein said main controller supplies the third control signal to said third selector so that the IF sound signal processed by said sound signal processor is output during both television mode and communication mode.

26. An intelligent television receiver as claimed in claim 16, wherein said main controller communicates data between said CPU and said television microcomputer and in communicating between said CPU and said television microcomputer, said main controller converts parallel data of a byte unit, output from said CPU, into serial data and transmits said serial data to said television microcomputer, and converts serial data received from said television microcomputer into parallel data of a byte unit and transmits said parallel data to said CPU.

27. A method of processing information data in an intelligent television receiver, operable with a value added network (VAN), said television receiver receiving and decoding information data of a graphic or text state, said method comprising the steps of:

(a) setting a communication mode;

(b) selecting a communication item if said communication mode is set;

(c) connecting the television receiver to the VAN when said communication item is selected;

(d) receiving information data from the VAN depending on said selected communication item when the television receiver is connected with the VAN;

(e) determining whether an error is generated in said received information data;

(f) requesting retransmission of said information data if an error is generated in said received information data in said step (e);

(g) decoding said received data if an error is not generated in said received information data in said step (e);

(h) displaying said decoded information data on a CRT of said intelligent television receiver;

(i) checking for a command depending on key inputs while performing said step (h);

(j) transmitting the command checked in said step (i) to the VAN if said command concerns a communication mode for said television receiver; and (k) disconnecting a line and converting the mode of the television receiver into a television mode if said command is a connection completion command.

28. An information data processing method as claimed in claim 27, wherein said step (c) comprises the sub-steps of:

(c1) transmitting a command for establishing a connection with the VAN;

(c2) determining whether the connection with the VAN is performed;

(c3) repeating attempts to connect with said VAN a predetermined number of times if the connection is not performed in said step (c2);

(c4) displaying an error message if connection is not obtained within said predetermined number of times in said step (c3); and (c5) communicating said communication item to the VAN when connection with the VAN is performed in one of steps (c2) and (c3).

29. An information data processing method as claimed in claim 27, wherein said step (d) comprises the sub-steps of:

(d1) receiving and demodulating data from the VAN at a predetermined transmitting and receiving speed;

(d2) error-correction demodulating data demodulated in said step (d1);

(d3) storing said error-correction demodulated data in a buffer; and (d4) generating an interrupt signal if said buffer is full of data in said step (d3).

30. A method of processing information data in a communication karaoke mode of an intelligent television receiver, said intelligent television receiver operable with a value added network (VAN) and transmitting and receiving information data from the VAN, said method comprising the steps of:

(a) setting said communication karaoke mode;

(b) selecting a desired song data;

(c) receiving said selected song data from the VAN;

(d) determining whether an error is generated in said received selected song data;

(e) processing said song data if an error is not generated in said received song data in said step (d); and (f) requesting retransmission of song data if an error is generated in said received song data in said step (d).

31. An information data processing method as claimed in claim 30, wherein said step (e) comprises the sub-steps of:

(e1) decoding said received song data into MIDI data and graphic data;

(e2) outputting the MIDI data decoded in said step (e1) as accompaniment music; and (e3) outputting the graphic data as scenery information decoded in said step (e1) as a background screen.

32. A method of processing information data in a communication karaoke mode of an intelligent television receiver, said intelligent television receiver operable with a value added network (VAN) and transmitting and receiving information data from the VAN, said method comprising the steps of:

(a) setting said communication karaoke mode;

(b) selecting a desired song data;

(c) receiving said selected song data from the VAN;

(d) determining whether said received selected song data is received without an error;

(e) processing said song data if said song data is received without an error in said step (d);

(f) transmitting a code signal to invalidate a counted service fee if an error is generated in said received song data;

(g) canceling the transmission fee corresponding to a error-bearing song; and (h) requesting retransmission of said selected song data.

33. An information data processing method as claimed in claim 32, wherein in said step (g), the transmission fee is canceled, if said counted fee invalidating code signal is received in the VAN.

34. An information data processing method as claimed in claim 32, wherein said step (e) comprises the sub-steps of:

(e1) decoding said received song data into MIDI data and graphic data;

(e2) outputting the MIDI data decoded in said step (e1) as an accompaniment music; and (e3) outputting the graphic data as scenery information decoded in said step (e1) as a background screen.

* * * * *